(12) United States Patent
Morley et al.

(10) Patent No.: US 9,995,570 B2
(45) Date of Patent: Jun. 12, 2018

(54) IN-LINE INSPECTION OF OPHTHALMIC DEVICE WITH AUTO-ALIGNMENT SYSTEM AND INTERFEROMETER

(71) Applicant: Johnson & Johnson Vision Care, Inc., Jacksonville, FL (US)

(72) Inventors: Catie A. Morley, Saint Johns, FL (US); Leslie A. Voss, Jacksonville, FL (US); Magnus Akerstrom, Jacksonville, FL (US); Kenneth L. Cagle, Jacksonville, FL (US); Charles Albanese, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 42 days.

(21) Appl. No.: 14/835,356

(22) Filed: Aug. 25, 2015

(65) Prior Publication Data

US 2016/0061689 A1 Mar. 3, 2016

Related U.S. Application Data

(60) Provisional application No. 62/043,038, filed on Aug. 28, 2014.

(51) Int. Cl.
*G01B 11/24* (2006.01)
*G02C 7/04* (2006.01)
(Continued)

(52) U.S. Cl.
CPC ...... *G01B 11/2441* (2013.01); *G01B 9/02076* (2013.01); *G01M 11/0271* (2013.01); *G02C 7/04* (2013.01)

(58) Field of Classification Search
CPC ............ G01M 11/081; G01M 11/0271; G01B 9/02076; G01B 11/2441; G02C 7/04
See application file for complete search history.

(56) References Cited

U.S. PATENT DOCUMENTS 5,054,925 A * 10/1991 Hunter .................. G01B 11/27
356/153
5,557,408 A * 9/1996 Kanaya .............. G01B 9/02007
356/514
(Continued)

FOREIGN PATENT DOCUMENTS

EP 2216621 A1 8/2010
JP 2003057025 A 2/2003
(Continued)

OTHER PUBLICATIONS

Neal Brock: "Dynamic interferometry", Proceedings of SPIE, vol. 5875, Jan. 1, 2005 (Jan. 1, 2005), pp. 58750E-1, XP055012515, US ISSN: 0277-786X, DOI: 10.1117/12.621245 ISBN: 978-1-62841-839-2.
(Continued)

*Primary Examiner* — Michael P Lapage

(57) ABSTRACT

Disclosed are in-line apparatuses, systems and methods for measuring a physical characteristic of a constant supply of an ophthalmic device, the apparatuses including: an interferometer; an automatic alignment system that positions the interferometer or ophthalmic device; and a central processing unit in communication with the automatic alignment system and receiving measurements from the interferometer. The in-line apparatus measures the desired physical dimensions of the ophthalmic device in real time. In-line systems, apparatuses and methods for measuring a physical characteristic of an ophthalmic device can include: a camera imaging an actual position of a feature of the ophthalmic device; a vibration resistant interferometer projecting a surface measurement beam having a wavelength that transmits through a beam splitter onto the ophthalmic device; and an automatic alignment system positioning the interferometer and the camera.

13 Claims, 7 Drawing Sheets

(51) Int. Cl.
*G01M 11/02* (2006.01)
*G01B 9/02* (2006.01)

(56) References Cited

U.S. PATENT DOCUMENTS

| | | | | |
|---|---|---|---|---|
| 5,818,573 A * | 10/1998 | Lafferty | ............. | G01M 11/0221 356/127 |
| 7,230,717 B2 | 6/2007 | Rock et al. | | |
| 2005/0036152 A1* | 2/2005 | Ueki | ......................... | G01J 9/02 356/512 |
| 2005/0083537 A1* | 4/2005 | Kuchel | ............. | G01B 11/2441 356/513 |
| 2006/0066874 A1* | 3/2006 | Ueki | ................. | G01B 9/02057 356/512 |
| 2008/0151236 A1* | 6/2008 | Prince | ................ | G01M 11/0285 356/246 |
| 2011/0279823 A1* | 11/2011 | Ueki | ................. | G01B 11/2441 356/511 |
| 2011/0304819 A1 | 12/2011 | Juhasz et al. | | |
| 2011/0304856 A1* | 12/2011 | Ge | ..................... | G01B 11/2441 356/511 |
| 2013/0063730 A1* | 3/2013 | Sykora | ............... | G01B 11/2441 356/511 |

FOREIGN PATENT DOCUMENTS

| | | |
|---|---|---|
| JP | 2005147715 A | 6/2005 |
| JP | 2006245174 A | 9/2006 |
| WO | WO 2001025721 A1 | 4/2001 |
| WO | WO2008080074 A2 | 7/2008 |

OTHER PUBLICATIONS

Mike Zecchino: "Beating vibration", Nature Photonics, vol. 2, Nov. 1, 2008 (Nov. 1, 2008), XP002750326,DOI: 10.1038/nphoton.2008. 217 the whole document 2,12.
International Search Report for Application PCT/US2015/046670 dated Mar. 31, 2016.

* cited by examiner

IN-LINE INSPECTION OF OPHTHALMIC DEVICE WITH AUTO-ALIGNMENT SYSTEM AND INTERFEROMETER

CROSS REFERENCE TO RELATED APPLICATIONS

This application claims priority to U.S. Provisional Patent Application No. 62/043,038 filed Aug. 28, 2014, which is hereby incorporated herein by reference in its entirety.

TECHNICAL FIELD

The present disclosure relates to in-line apparatuses for real-time measuring of the physical dimensions of ophthalmic devices during a continuous or semi-continuous manufacturing process.

BACKGROUND OF THE INVENTION

Although off-line analytical equipment exists for measuring physical dimensions of ophthalmic devices for quality control purposes, such "after-the-fact" results may be adequate to pass or fail certain lots of product, but they are not sufficient to make improvements during manufacture to reduce off-specification materials. Typically, an interferometer is relied upon for off-line analysis to detect surface irregularities. Such an interferometer relies on its own internal alignment system to take measurements.

In general, an interferometer works by splitting a beam of light into two separate beams: one reference beam is sent directly to a "reader sensor", and the other test beam is directed to a lens or lens mold of interest, then into the "reader sensor." The reference beam and test beam are then recombined. The difference between the reference beam and test beam is the interference created by the lens or lens mold of interest, thus providing an analog signal describing the effect of the lens or lens mold on a beam of light. Currently, an interferometer may be used as a tool to find alignment of the interferometer to a lens or lens mold of interest by using a portion of the light signal from the interferometer to produce a projected image onto a screen or detector. The interference between the reference beam and test beam are displayed and imaged on a detector. The projected image is distorted by the lens or lens mold of interest by bending the light to one side when it is not located over the center of the lens or lens mold. The light bends more as the distance from the center is increased, and the light bends in relation to the direction of motion needed. The projected image is then viewed with a vision system and compared to a round, sharp edged, circle. The position of the interferometer is moved in X, Y and Z until the projected image matches such a round, sharp circle. By moving the interferometer beam, the projected image will form a perfect circle when the light from the emitter is passing through the dead center of the lens or lens mold of interest. The projected image may also appear scattered or fuzzy due to variation in 'focus' by the lens or lens mold when it is not in its ideal height above the lens or lens mold. By locating the interferometer at the right height above the lens or lens mold, the beam of light passes through the lens or lens mold center with the least possible scattering of light; the edge of the projected image will become sharp and the size is small. The ideal image would be a perfect circle with no points or distortions outside the edge of the circles. There is one height where the projected image is the sharpest, and this is where the system must reside for ideal measurement with the interferometer.

Currently employed interferometer methods and systems, however, have many drawbacks. First, the interferometer has to be very well aligned with the lens mold or lens of interest. Current methods rely on the shape of the projected image to adjust the height and center point of the interferometer to align with the lens or lens mold of interest. To achieve proper positioning of the interferometer, current interferometer systems and methods require a second beam splitter for that beam, which induces some error by passing the beam through a lens or lens mold wherein the positions must be adjusted to account for the error introduced by the second beam splitter on the beam. In addition, adding the second beam splitter decreases the signal to the interferometer reader sensor. Therefore, a greater percentage of the signal sent to the positional 'screen' provides a better image having more contrast to adjust for location, but also removes contrast from the final interferometer image. Current systems and methods also require that the position of the projection screen must be perpendicular to the split beam to prevent the image from becoming oblong. Similarly, the position of the camera must be perpendicular to the screen to prevent the image from becoming distorted wherein the image will not appear to have a round shape. Failure to ensure that the position of the camera is perpendicular to the screen may result in an unadjustable error. Moreover, the occurrence of tolerance stack-up is unavoidable in the current multi-part systems and methods because errors accumulate through the use of multiple parts including a second beam splitter, projection screen and camera whereby the distortion created by each misaligned part is cumulative and results in a distorted final image. Thus, in the current systems and methods, tolerance stack-up must be corrected at each step of the positioning process. In addition, current methods provide a very limited alignment capability due to the rapid loss of the interferometer signal from the detector or screen.

Moreover, with a conventional phase-shifting laser interferometer, multiple frames of data are acquired over many milliseconds allowing enough time for vibration and turbulence caused by environmental factors to degrade the measurement results and its use under off-line conditions is adequate to provide pass/fail results.

Currently, the contact lens diameter may be measured after manufacturing including hydration, packaging and sterilization. This does not provide real time feedback to the manufacturing personnel to correct out of control conditions.

There is thus a need in the ophthalmic industry to improve manufacturing product quality by providing analytical equipment and techniques that can be implemented on the manufacturing line for use during a continuous or semi-continuous manufacturing process. Further, in order to measure a contact lens surface and center thickness, two measurement systems are needed, which adds complexity to the measuring. In multiple measurement systems there is a need to locate between a lens surface and the center thickness measurement device.

SUMMARY

In one aspect, an in-line apparatus for measuring a physical characteristic of an ophthalmic device, includes: a vibration insensitive interferometer that is configured to determine physical dimensions of a constant supply of the ophthalmic device; an automatic alignment system that positions the interferometer or ophthalmic device; and a central processing unit (CPU) in communication with the automatic alignment system and receiving measurements from the interferometer. In this aspect, the physical dimensions of the ophthalmic device are determined in real time.

In another aspect, an in-line apparatus for measuring a physical characteristic of an ophthalmic device that is a contact lens mold or a lens, includes: a vibration insensitive interferometer that is configured to determine physical dimensions of a constant supply of the ophthalmic device; an automatic alignment system comprising a camera, a positioner, and a controller employing control loop feedback, the system being effective to position the interferometer; and a central processing unit (CPU) in communication with the automatic alignment system and receiving measurements from the interferometer. In this aspect, a front curve radius, a back curve radius, and/or a power of the ophthalmic device are determined in real time.

In another aspect, an in-line system for measuring a physical characteristic of an ophthalmic device, includes: a camera that is configured to image an actual position of a feature of the ophthalmic device; a vibration resistant interferometer that is configured to project a surface measurement beam having a wavelength that transmits through a beam splitter onto the ophthalmic device, the vibration resistant interferometer being configured to send measurements to a central processing unit (CPU); an automatic alignment system that is effective to position the interferometer and the camera, the automatic alignment system being in communication with the CPU. In this aspect, an optimal X, Y position of the ophthalmic device is determined by moving the camera to an expected position of the ophthalmic device and calculating an offset as a difference between the expected position and the actual position. In this aspect, a laser measurement device is configured to move in a Z-direction to focus the surface measurement beam at the calculated X, Y position and determine a Z position for the feature of the ophthalmic device. In this aspect, the measurements of the ophthalmic device are completed by moving the vibration resistant interferometer and/or ophthalmic device based on the determined X, Y, Z position in relation to the ophthalmic device.

Additional features, advantages, and embodiments of the invention are set forth or apparent from consideration of the following detailed description, drawings and claims. Moreover, it is to be understood that both the foregoing summary of the invention and the following detailed description are examples and are intended to provide further explanation without limiting the scope of the invention as claimed.

Figure 1:
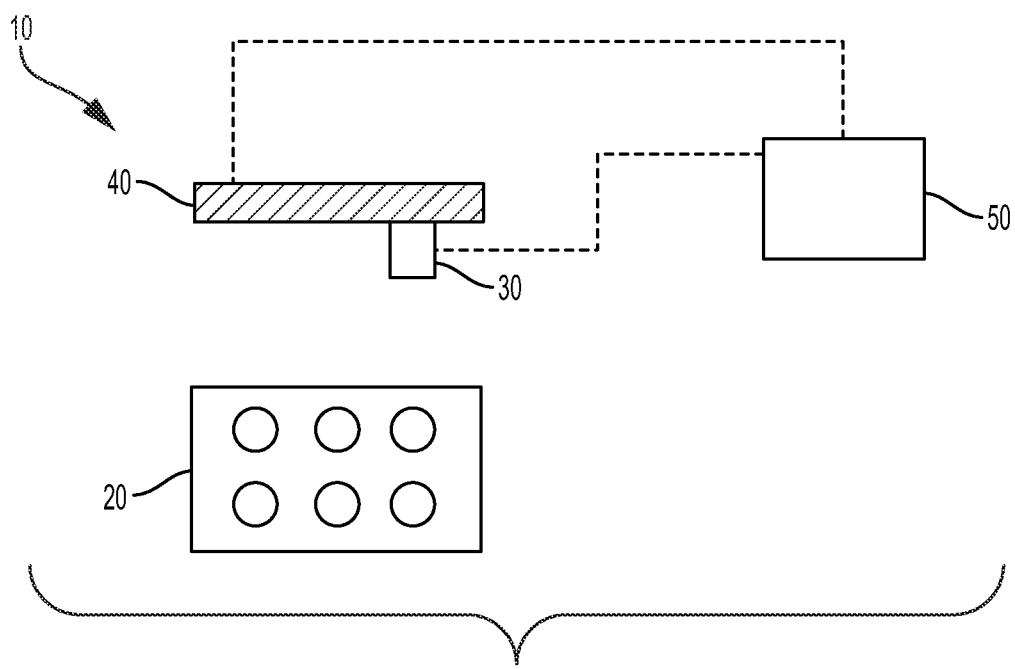
FIG. 1 is a representation of an in-line apparatus for measuring a physical characteristic of an ophthalmic device, according to an embodiment of the present invention.

Before describing several exemplary embodiments of the invention, it is to be understood that the invention is not limited to the details of construction or process steps set forth in the following description. The invention is capable of other embodiments and of being practiced or being carried out in various ways.

DETAILED DESCRIPTION OF THE DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Apparatuses that allow for in-line analysis of ophthalmic devices are provided. An ophthalmic device may be a contact lens, intraocular lens, ocular insert, or a mold for making any of the foregoing. Using interferometry equipment that can acquire all phase data simultaneously, in a minimal amount of time, to enable the analytical equipment to measure the physical dimensions of ophthalmic devices in a noisy environment, despite vibration or air turbulence will improve manufacturing of ophthalmic devices, such as molds and contact lenses. When used in this fashion, the analytic equipment and techniques are able to provide immediate feedback on the process performance. This allows for production personnel to immediately make corrections to the process if necessary. In some cases the feedback can be directed back to the machine, which can make corrections automatically. This is called closed-loop process control. Using this methodology, product quality is controlled continuously through real-time process control, which produces a consistently higher level of product quality and saves product from being scrapped, which saves time and money.

Typical measurements for the quality of lens or lens molds include specific information on power and radius—which can be provided real time by the apparatuses described herein. Additional data may also be obtained to describe the entire lens surface in analog detail. The information will enable deeper understanding of wavefront deviations for example; higher-order aberrations, including strehl ratios and peak to valley ratios. Analysis of these lens variations will result in further quality improvements that are not easily understood without this surface data.

In a first aspect, provided is an in-line apparatus for measuring a physical characteristic of a constant supply of an ophthalmic device, comprising: a vibration insensitive interferometer; an automatic alignment system that positions the interferometer or ophthalmic device; and a central processing unit (CPU) in communication with the automatic alignment system and receiving measurements from the interferometer. The physical dimensions of the ophthalmic device are determined in real time. The vibration insensitive interferometer may be a dynamic interferometer. The alignment system may include a camera, a positioner, and a controller employing control loop feedback—all in electronic communication. The camera may be a digital camera, charged coupled device (CCD), or complementary metal oxide semiconductor (CMOS). The positioner may be a locating arm to which the interferometer is attached or a carrier that transports the ophthalmic device. The alignment system is effective to position the interferometer or ophthalmic device to desired x, y, and/or z coordinates. The ophthalmic device may be a contact lens, intraocular lens, ocular insert, or a mold for making any of the foregoing. The physical dimensions of the ophthalmic device may include one or more of a front curve radius, a back curve radius, analog surface information, diameter and a power. The physical dimensions may be calculated continuously by the vibration insensitive interferometer in real time and may be performed at intervals in the range of around 20-40 µs. The constant supply of ophthalmic devices may occur at intervals in the range of around 0.5 to 60 seconds.

In another aspect, an in-line apparatus for measuring a physical characteristic of a constant supply of the ophthalmic device that is a contact lens mold or a lens includes: a vibration insensitive interferometer; an automatic alignment system comprising a camera, a positioner, and a controller employing control loop feedback. The system is effective to position the interferometer; and a central processing unit (CPU) in communication with the automatic alignment system and may receive measurements from the interferometer. The apparatus may determine a front curve radius, a back curve radius, diameter and/or a power of the ophthalmic device in real time.

In yet another aspect, a method of measuring a physical characteristic of an ophthalmic device in-line is provided, comprising continuously supplying the ophthalmic device; obtaining a vibration insensitive interferometer that sends measurements to a central processing unit (CPU); positioning the interferometer or ophthalmic device with an automatic alignment system that is in communication with the CPU; and determining in real time physical dimensions of the ophthalmic device. The determining step may further comprise locating a periphery of the ophthalmic device and calculating the diameter of the ophthalmic device using a fit circle technique. The step of locating a periphery of the ophthalmic device may be performed using an image segmentation method.

The positioning step may comprise moving the camera to a first position, imaging the ophthalmic device, calculating an adjusted position, and moving the interferometer to a measuring position. In addition, the method may comprise moving the camera to a second position after calculating the adjusted position, re-imaging the ophthalmic device, and calculating a second adjusted position before moving the interferometer to a measuring position.

Provided are apparatuses assessing a constant supply of the ophthalmic devices and having an automatic alignment system, an interferometer, and a central processing unit (CPU). An ophthalmic device may be a contact lens, intraocular lens, ocular insert, or a mold for making any of the foregoing. It has been found that the use of an interferometer that is insensitive to vibration in a manufacturing line provides the precision and accuracy needed to take real time measurements of the physical dimensions of ophthalmic devices. A vibration-insensitive interferometer may be used to acquire all phase data simultaneously. Exemplary vibration-insensitive interferometers may be, for example, a dynamic interferometer, such as those commercially available from 4D Technology, the Dimetior VB Simultaneous Phase-Shifting Fizeau Interferometer available from ESDI, or the DynaFiz instantaneous Fizeau-type interferometer as available from Zygo Corp. A vibration insensitive interferometer, such as those disclosed in U.S. Pat. Nos. 6,304,330, 6,552,808, and 7,230,717 may also be used to acquire all phase data simultaneously, in as little as thirty microseconds. This speed enables the vibration insensitive interferometer to measure physical characteristics in noisy environments, despite vibration solution or air turbulence. Such an interferometer, in conjunction with an automatic alignment system, is disclosed in the present invention to improve manufacturing of ophthalmic devices such as molds and contact lenses. The largest dimension of the vibration insensitive interferometer may be less than 20 inches, or less than 15 inches, or even less than 10 inches. In contrast to existing interferometer systems used for analyzing ophthalmic devises, the apparatuses provided herein have the following benefits based on the decoupling of an alignment system from an interferometer.

The position of a camera of the automatic alignment system relative to the position of the interferometer can be managed as a known offset. The camera can image the lens directly, then locate to the lens. The software can offset from that position to an interferometer position. Since these two are not the same, an offset can be required—and this offset can be changed to match the actual system geometry.

Vibration-insensitive interferometers may be used as provided by manufacturer and, as disclosed herein, the alignment system adds, for example, an optical camera. The interferometer thus does not change. The camera can be mounted such that the axes of the camera and the interferometer are parallel.

The camera angle of alignment can be easier to manage because the single part (the locating arm) holding the interferometer and camera may be one part. Precision machining of one part achieves accurate tolerances—it is multiple parts assembled that create large tolerance stack-ups. If the camera axis was not perfectly parallel to the interferometer axis, then the observed shape of a round lens feature at the camera would be slightly elliptical. Rather than keying upon the shape, the center can be relied upon; the process can find the center of the lens just as easily from the center of an ellipse—so long as this is rigid and repeatable. The standard offset between the camera and the interferometer can adjust for any variation in position or angle.

Disassembly and reassembly of the apparatuses disclosed herein can generally result in two variables changing: the distance from the imaged lens center to the interferometer beam center, and the vertical distance from the lens to camera and the ideal focal height of the interferometer. If the system cannot be designed to eliminate these variables, then a simple calibration and offset can allow the system to learn the new camera to interferometer offset, then run as normal. Critical setup is not necessary to easily calibrate out the variance.

The following define specific terms, as they are understood to be used in the present disclosure.

The term "constant supply" can refer to the presence of the ophthalmic device at regular or predictable intervals resulting from a manufacturing process that is operated, for example, continuously or semi-continuously or batch-wise. Included are all types of manufacturing processes such as those using continuous- or semi-continuous-motion machinery.

The term "physical dimensions" can refer to measurements of the ophthalmic device that reflect size and shape of the device. Typically, to determine physical dimensions, multiple data points are collected by an analytical device such as an interferometer. Physical dimensions include, but are not limited to, radius and topography, and more particularly, analog surface information, radius of the front curve mold, radius of the back curve mold, and/or radius of a lens, for example, an unhydrated (dry) lens in the front curve mold. Physical dimensions of contact lens molds may be used for, among other actions, correlating with resulting contact lens radii and powers, determining deviations from design intent, and/or making process or quality control decisions during a continuous or semi-continuous process. Physical dimensions of contact lenses may be used for accepting product for further processing including packaging and for rejecting product before it goes any further in the manufacturing process.

The term "real time" can mean during manufacturing. As desired, real time action regarding process and/or quality control can be taken to reduce the frequency and/or repetition and/or avoid out-of-specification product.

The term "automatic alignment system" can refer to a sensor—for example a camera—in conjunction with a mechanical device, such as a locating arm or a carrier, which locates the ophthalmic device in the range of analytical equipment such as an interferometer so that the interferometer can instantly and reliably take measurements of the ophthalmic device. The alignment system may be considered as providing an initial "gross location", but even so, it is expected that the alignment system may exhibit excellent tolerance so that the interferometer may locate a targeted point of the desired ophthalmic device in a very short time. Reference to a tolerance of ±25 μm means that the alignment system locates the ophthalmic device in the same location every time within ±25 μm of the exact target. An automatic alignment system can comprise a camera, such as a digital camera, charged coupled device (CCD), or complementary metal oxide semiconductor (CMOS), which is in electronic communication with a positioner and controller employing control loop feedback. Systems can include as positioners: a locating arm to which an interferometer is attached or a carrier for the ophthalmic device. The positioner may be provided as a one-piece unit to reduce tolerance stack-ups. For one representative example, a pallet is a carrier for one or more molds of the ophthalmic device. Another representative example is a mold being a carrier for a lens.

Although alignment systems using three-dimensional (3D) sensors are known in the art, the output of the three dimensional sensors are in the form of directional data for manual motion adjustment to be performed by a person. For manufacturing purposes, however, there is a need for a simpler, easier way to perform the measurements real-time. Some embodiments of the system described herein use a two dimensional (2D) camera rather than a 'complex' three-dimensional data sensor. Some embodiments may also use a charged coupled device (CCD), or complementary metal oxide semiconductor (CMOS). The data and calculations provided by the apparatus described herein drive automated precision actuators to position the device in desired X, Y and Z coordinates. Without automatic motion, the systems currently used in the art cannot be deployed upon a constantly or continuously cycling production process. In contrast to the systems currently used in the art that rely upon the use of a 3D sensor, some embodiments of the claimed invention first use a two-dimensional camera system to align the locating arm or carrier in an X, Y, Z position, then the apparatuses validate and fine tune the data using the interferometer data. This secondary system further improves the locational accuracy. The alignment system described herein uses a camera system of 2D images to gain 3D location to begin interferometer usage to allow for simpler calculations resulting in a simpler, faster, and more accurate alignment without analyzing 3D space, as currently used in the art.

One embodiment utilizes a 2D vision camera to measure the dry contact lens diameter while it is still in the Front Curve mold. This measurement can correlate to the finished lens diameter and allow the manufacturing personnel to react to trends and out of control conditions. An alternative to measuring the dry lens diameter can be to measure the knife edge of the front curve prior to dosing. This too can correlate to the finished lens diameter.

In general terms, the alignment system and interferometer can be decoupled from one another and mounted such that the axes of the alignment system and the interferometer are parallel to reduce or eliminate the occurrence of tolerance stack-up. The position of the alignment system relative to the position of the interferometer can be set a fixed distance and this is managed as a known offset. The alignment system can image the lens directly, and then proceed to locate the lens thereby increasing the efficiency of the system. Software can be utilized to calculate and adjust the position of the interferometer for any variation in position or angle based on the measurement of the known offset between the camera and the interferometer. The known offset between the alignment system and interferometer may be changed to match the actual system geometry, including position and angle of the alignment system and interferometer.

The term "readily identifiable feature" can refer to a fixed reference point added to an ophthalmic device for the purpose of later identification. In one or more embodiments, the readily identifiable feature may be in any form including, but not limited to, a tab, notch, gate, diametric edge, and/or flange. For example, the readily identifiable feature may be located a known distance from the center of the lens such that upon optical imaging, the location of the actual center of the device is known. Readily identifiable features may be product-specific in that a product is identified by a unique code such as an SKU (stock-keeping unit) number.

In one or more embodiments, the readily identifiable feature of a circular or spherical lens is in the form of a feature that is the outside diameter of the lens or the diameter of the mold and is the most visible and most accurate feature upon which to orient for X-Y location. Other features could be chosen, and if so, these should be similar features that a critical portion of the lens mold, such as the optic zone, and the feature of interest are manufactured together to minimize tolerance stack-up error. The readily identifiable feature selected can also be useful for alignment with respect to the Z-coordinate with the inclusion of sag data for location of the surface of interest relative to the readily identifiable feature for a specific product.

In one aspect of the present invention, an in-line apparatus is provided for measuring a physical characteristic of an ophthalmic device. With reference to FIG. 1, an in-line apparatus (10) is provided for assessing a constant supply of the ophthalmic device (20), where the in-line apparatus comprises a vibration insensitive interferometer (30); an automatic alignment system (40) that positions the interferometer or ophthalmic device; and a central processing unit (50), hereinafter referred to as a "CPU" in communication with and receiving measurements from the interferometer (30). The CPU (50) is also usually in communication with a component of the automatic alignment system (40) and/or interferometer (30). The in-line apparatus is capable of determining the physical dimensions of the ophthalmic device in real time.

In one or more embodiments, the vibration insensitive interferometer (30) is a dynamic interferometer. The interferometer may comprise a light source (long or short coherence); mirrors; one or more detectors; one or more collimating lens; one or more beam splitters; imaging optics; and reference surface.

Figure 2A:
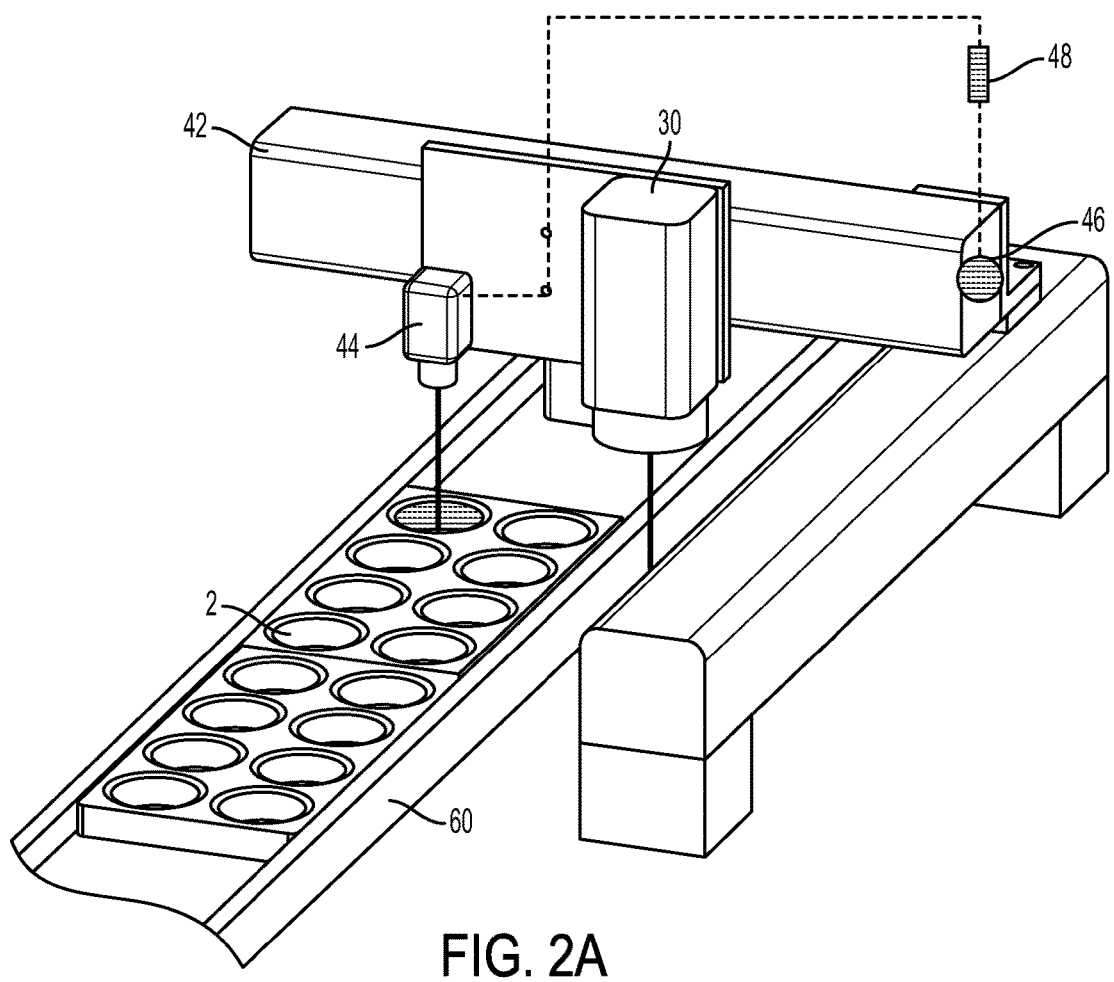
FIG. 2A provides a schematic view of an automatic alignment system in conjunction with components of the in-line apparatus, according to an embodiment of the present invention.
Figure 2B:
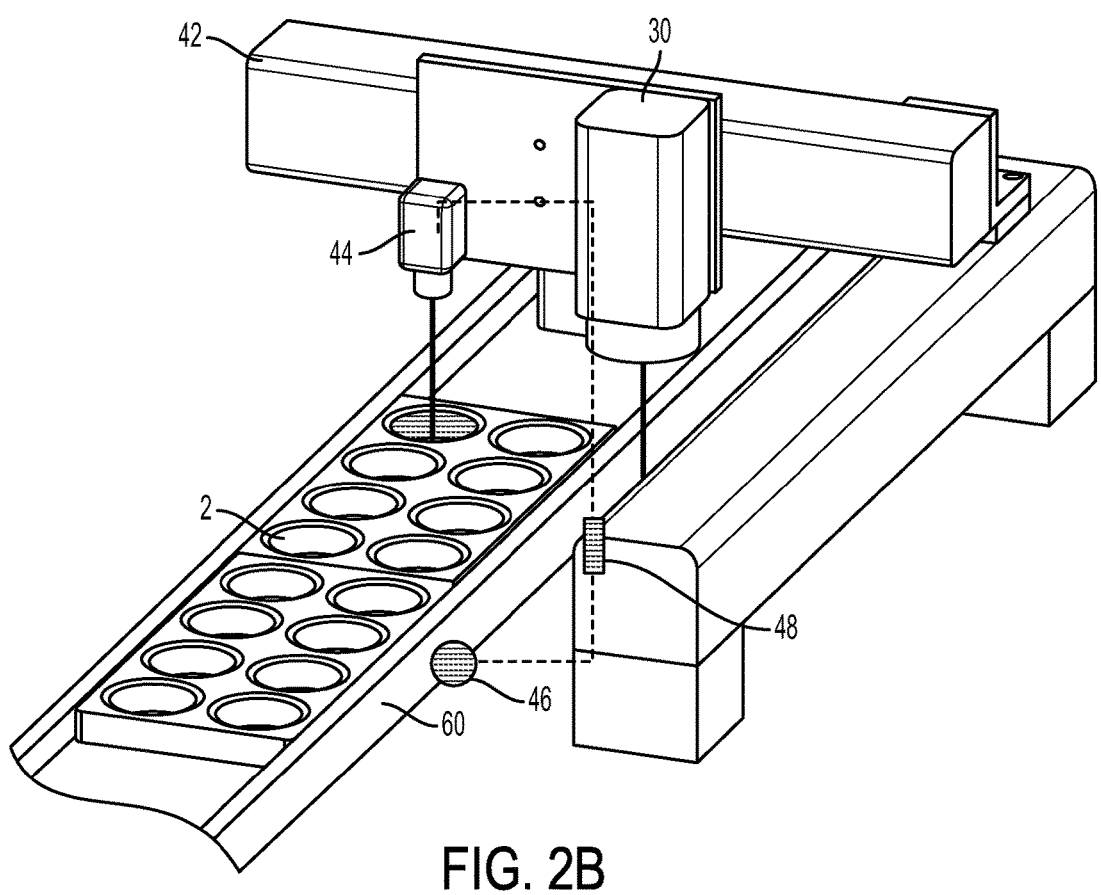
FIG. 2B provides a schematic view of an automatic alignment system in conjunction with components of the in-line apparatus, according to an embodiment of the present invention.

FIGS. 2A and 2B provide schematic views of exemplary automatic alignment systems (40) shown in FIG. 1 in conjunction with components of the in-line apparatus. In one or more embodiments, the alignment system (40) may comprise a locating optical device, such as a two-dimensional camera (44), in communication with a positioner, such as a locating arm (42) or a carrier (60) alone or with an actuator, motor, or servo (46), and a controller employing control loop feedback (48). The CPU (50) can perform calculations to determine the center position of the lens, and the current distance from this center position to the camera. Some embodiments of the system may use commercially available image segmentation methods, such as Sobel or Canny, to find the periphery of the ophthalmic device. Fit circle techniques may then be used to find the closest circle that fits the ophthalmic device from which the diameter and center position of the ophthalmic device may be calculated. The CPU (50) further drives the automatic actuator, motor, or servo the calculated distance from the center position of the lens to the camera through a communication protocol.

In one or more embodiments, the locating optical device, such as a two-dimensional camera (44), can have its own processing unit that runs processes to find the image center and present this data to the CPU to compare this center to its current location. In one or more embodiments, the interferometer (30) can also have a processing unit to determine its distance from the center of the lens, and then feed this to the CPU (50). The CPU (50) can then use this data, along with a decision tree based on the camera's calculations and the interferometer's calculations, to very precisely move the locating arm to an aligned condition. Once in an aligned condition, the CPU (50) continues control by triggering, recording, and transmitting the data it receives from the interferometer (30). It is understood that although there are multiple processing units possible within the system wherein each main component may have some processing capability, the term "CPU" can include one or more individual processing units which are used to integrate the camera, actuator controllers, and interferometer of the in-line apparatus.

The automatic alignment system (40) is capable of positioning the interferometer or the ophthalmic device within a distance of +/−12.5 μm in any one or combination of X-Y-Z positions. That is, the x-axis is a horizontal position parallel to the locating arm, the y-axis is a horizontal position normal to the locating arm, and the z-axis is a vertical position. The X-Y distance can be found by knowing the center point of the readily identifiable feature, such as the outside diameter of the lens or diameter of the mold, and its current center position, then calculating and moving the X and Y distances to align. The Z height can be found by using narrow depth of field imaging to maximize sharpness on a given feature. By imaging the readily identifiable feature and moving in the Z direction until the readily identifiable feature has the least transition pixels, or the sharpest transition from white to black within an available focal region, a highly repeatable position of 'ideal focus' is identified and can be utilized to consistently locate to. The camera may comprise a two-dimensional camera that may be in electronic communication with the positioner. The alignment system can be effective to position the interferometer or ophthalmic device to desired x, y, and z coordinates.

In one or more embodiments, the ophthalmic device can be a contact lens mold or a lens. The physical dimensions of the ophthalmic device may include one or more of the following: a front curve radius, a back curve radius, analog surface information and a power. The constant supply of ophthalmic devices may occur at intervals in the range of 0.5 to 60 seconds, preferably between 3 to 20 seconds. The physical dimensions measured continuously by the interferometer (30) in real time may be performed at intervals in the range of 20-40 μs.

In one or more embodiments, as shown in FIGS. 2A and 2B, the camera (44) and interferometer (30) are mounted together at a fixed distance from each other on a movable locating arm (42) that is capable of being moved in X, Y and Z-directions by a moving mechanism such as an actuator, motor, or servo. The ophthalmic devices are located within a mechanical tolerance in a known X-Y pitch under the locating arm (42). An actuator, a motor and/or a servo (46) may move the locating arm in the X, Y, and Z direction to desired X, Y, and Z coordinates of each lens. In FIG. 2A, there is a controller employing control loop feedback (48) between the camera (44) and an actuator (46) affixed to the locating arm (42).

In FIG. 2B, there is a controller employing control loop feedback (48) between the camera (44) and an actuator (46) affixed to the carrier (60).

Figure 3:
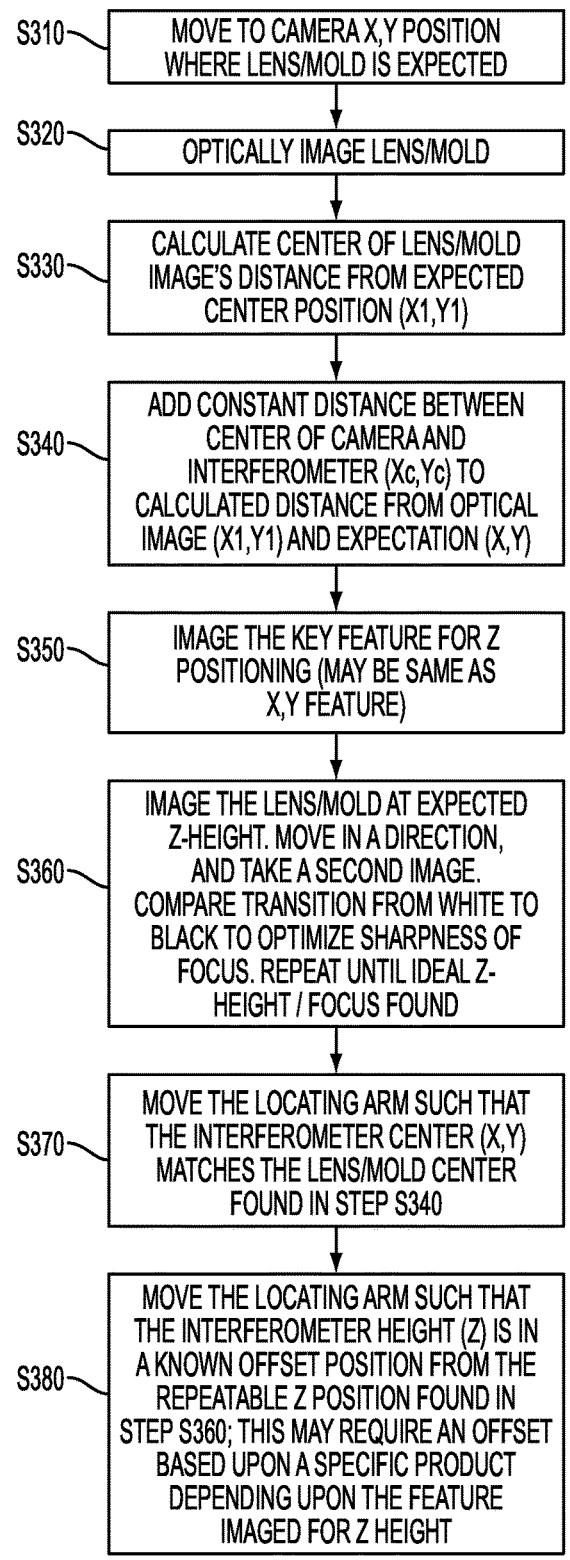
FIG. 3 provides a flow chart of basic in-line interferometer management, according to an embodiment of the present invention.

Turning to FIG. 3, provided is a flow chart of basic in-line interferometer management. For a method of basic operation, steps S310, S320, S330, S340, and S350 are performed. Specifically, in step S310, the locating arm is moved to locate the camera at an initial X,Y position (referred to hereinafter as (X,Y)) in the vicinity of where the lens/mold center is expected. In step S320, the camera captures an optical image of the lens/mold. In step S330, the captured optical image is conveyed to a central processing unit ("CPU") to calculate the distance, if any, from the actual position of the lens center to the expected lens center position (referred to hereinafter as "(X1,Y1)". In step S340, the CPU will then add the constant known distance between the centers of the optical camera and the interferometer (referred to hereinafter as "(Xc, Yc)") to the calculated distance (X1, Y1). In step S350, the locating arm will then be moved to a position such that the interferometer center matches the lens/mold center. The coordinates for the final interferometer position will be obtained according to the following equation (1):

$$\text{Final } X,Y \text{ Coordinate Interferometer position} = (X,Y) + (X1,Y1) + (Xc,Yc) \quad (1).$$

Once the final X-Y position is found, a repeatable Z position of the interferometer can be found. This can be done by recording two images of the ophthalmic device, then moving the camera to minimize the gray area between the white and black of the feature imaged. Thus, the camera can be moved in the Z axis until the image of least transition is found or the area with the sharpest transition from white to black is found. The Z position can describe a known position over a known feature on the mold, which then can be used to direct the final interferometer position in the Z axis. Thus, as depicted in step S360, the lens/mold may be imaged at an expected Z-height, after which the lens/mold is imaged again after the camera has moved. A comparison of the transition from white to black to optimize sharpness of focus can be found, and the process can be repeated until an ideal Z-position is found. Similar to the X,Y determination, the Z-position can be the ideal optical position, plus a known constant, but also may include a product-specific identification number. The feature of focus does not have to be the same Z-height as the point of interest.

$$\text{Final Interferometer Zheight} = \text{Zcamera} + \text{Zconstant offset} + \text{Zproduct specific}$$

As depicted in steps S370 and S380, the locating arm can be moved to this X, Y and Z interferometer position such that the interferometer center matches the lens/mold center, and is of the correct height to gather data with the interferometer. In one or more embodiments, the calculation of the final X, Y and Z positions may be done in a sequential or simultaneous process.

Figure 4:
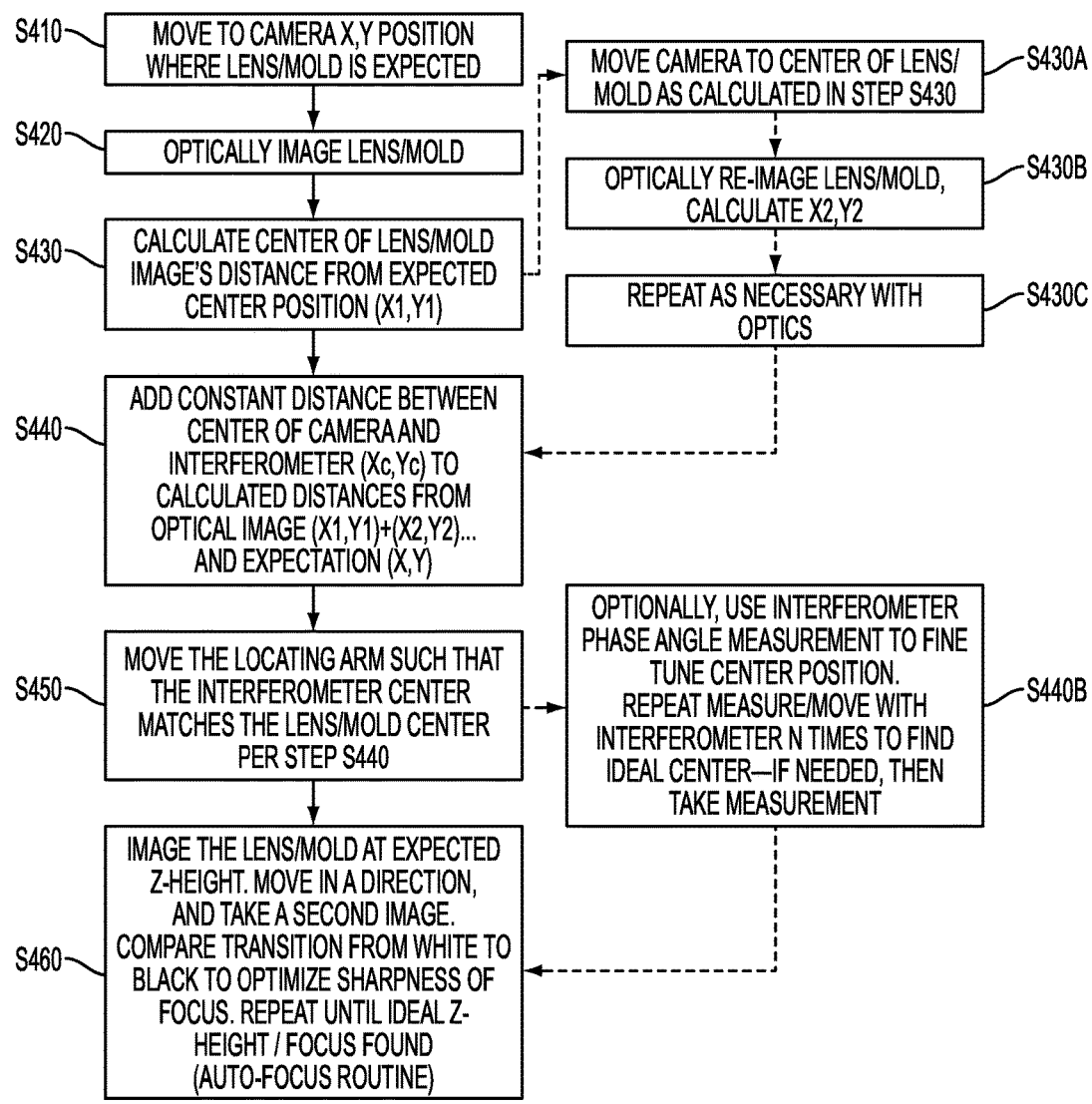
FIG. 4 provides a flow chart of iterative in-line interferometer management, according to an embodiment of the present invention.

FIG. 4 illustrates a method that includes one or more iterations. As compared to the basic operation of FIG. 3, steps S430A, 430B and 430C are added after step S430 and step S440 replaces step S340. Thus, in step S410, consistent with the basic operation, the locating arm can be moved to locate the camera at an initial X,Y position in the vicinity of where the lens/mold center is expected. In step S420, also consistent with the basic operation, the camera can capture an optical image of the lens/mold. In step S430, the captured optical image can be conveyed to the CPU to calculate the difference, if any, from the actual position of the lens center to the expected lens center position (X1,Y1). Then, to provide further precision, in step S430A, the camera can be moved the calculated distance (X1,Y1) and in step S430B, the lens/mold is reimaged and a new distance (X2,Y2) can be calculated. Steps S430A and S430B can be repeated as desired in accordance with step S430C to determine any additional differences to account for. After the desired iterations occur, in step S440, the CPU will then add the constant known distance between the center of optical camera and the center of the interferometer (Xc, Yc) to the calculated the distances (X1,Y1) and (X2,Y2), . . . . In step S450, the locating arm can then be moved to a position such that the interferometer center matches the lens/mold center. The coordinates to the final interferometer position can be obtained according to the following equation (2):

$$\text{Final } X, Y \text{ Coordinate Interferometer position} = (X,Y) + (X1,Y1) + (X2,Y2) \ldots + (Xc,Yc) \quad (2).$$

In step S450, the locating arm can be moved to the final X, Y Coordinate interferometer position such that the interferometer center matches the lens/mold center. The final interferometer Z height may be calculated as discussed above.

Optionally, as shown in step S440B of FIG. 4, an interferometer phase angle measurement may be used to fine tune the center position. The acquired interferometer wavefronts can be used to fine tune its position relative to the part under test. This fine-tuning can be achieved by acquiring wavefronts and the interferometer can be moved to minimize the wavefront error. This method is also known as autonulling. In this embodiment, the process of capturing an optical image of the lens/mold and calculating the difference to the actual lens center may be repeated as needed to find the ideal lens center. Measure/move can then be repeated for the interferometer if needed and the measurement of the lens/mold can be taken and conveyed to the CPU.

The two dimensional imaging camera may achieve positioning of the interferometer relative to the mold/lens such that the surface of the ophthalmic device can be read. The alignment accuracy to achieve a reading of the surface of the ophthalmic device is about 25 microns in the X, Y, Z positions. If the interferometer reading is not ideal, but it is within the limits of the interferometer's readable position, then the data from the interferometer can be used to fine tune the actuator position to more perfectly align the interferometer to the ideal read position. For example, if the alignment system were only capable of +/−25 microns rather than the needed +/−12.5 microns, then a first point is identified by the alignment system and the interferometer attempts to capture a reading. If the interferometer does not capture a reading, then the interferometer is moved in intervals of 12.5 microns to capture subsequent readings to provide directional data to find the read position for the interferometer.

In one or more embodiments, the locating arm and/or carrier can be moved by an internal or external moving mechanism. In one or more embodiments, the moving mechanism may comprise one or more elements including, but not limited to, an electromagnetic alignment motor or servo, an x-axis alignment pulley, y-axis alignment pulley and a z-axis alignment pulley. The x-axis alignment pulley, y-axis alignment pulley and z-axis alignment pulley can be connected to the alignment motor/servo. When the alignment motor/servo rotates clockwise or counterclockwise, X, Y or Z gear can be turned to align the interferometer and camera along the desired X, Y or Z coordinate as determined by the CPU. In one or more embodiments, an electrical servo motor and a controller that has closed loop control on each of X, Y, and Z positions. These motors most typically are attached to a fine pitched screw and drive a fixed 'nut' along the screw which is attached to a slide mounted upon linear bearings; as the screw is turned, the nut and the slide move along the screw (while riding on the bearings) at a rate described by the pitch of the screw. A precise number of rotations yields a precise distance moved by the slide. In place of this screw, a belt or cable can be used to drive the slide along the bearings—in each case driving to the position found through the positioning systems described. In another embodiment, other non-motor systems could also be used by applying hydraulic actuators, pneumatic actuators, or linear motor systems where electromagnets are mounted along the axis of travel and energized to manage position of the slide directly without rotating. In yet another embodiment, gearbox systems with high reduction in positional motion relative to rotation of the input motor could be used to achieve an accurate linear actuator from a regular electrical motor. In yet another embodiment, a multi-axis robot may be used that completely controls the interferometer position in the X, Y and Z positions.

In one or more embodiments, the camera and interferometer can be mounted on the locating arm positioned over the constant supply of ophthalmic devices connected to one or more CPUs via a network. The network may be wireline or wireless, or a hybrid combination wherein some segments of the network are wireline and some are wireless. The one or more CPUs can receive information from the camera and/or interferometer via the wireline or wireless network, or direct-wired connection and process the information accordingly. For example, the CPU may send a signal across the network to the automatic alignment system, to tell the system which way to adjust. The CPU may also receive information from the interferometer regarding physical dimensions. The position of the ideal read point for the interferometer may be driven by knowledge of the specific product being measured. In this case once the repeatable z position is found, the product specific driven data describing the distance from the z-height imaged surface to the surface of interest must be added to the standard offset distance in the z axis. Furthermore, as a process is run, the software may learn an improved starting point by trending past starting points thus achieving ideal positions with less reads. This could be extrapolated to include historical data that describes the ideal position for the specific product to create a more efficient start point thereby decreasing the time it takes to complete positioning to improve overall efficiency of the process.

The camera may be configured to locally store an image on the CPU (50). The CPU (50) may receive images from the digital camera via network. For each image, the CPU (50) can analyze the readily identifiable feature located on the ophthalmic device/holder. Based on the X, Y and/or Z coordinates of the readily identifiable feature, the actual X, Z and/or Z coordinates of the center of the ophthalmic device may be determined. From there, as shown in FIGS. 3-4, the CPU can calculate an adjusted X-Y-Z set of coordinates and then transmit the adjusted X-Y-Z set of coordinates to the automatic alignment system via the network, which can then re-position the interferometers. Thus, as depicted in step S460, the lens/mold can be imaged at an expected Z-position, and after moving in a direction and taking a second image, a comparison of the transition from white to black to optimize sharpness of focus can be performed. The process can be repeated until the proper alignment of the interferometer is achieved.

In one or more embodiments, the physical dimension measurements obtained by the in-line apparatus of the present invention may be utilized for quality control and statistical control process applications to make improvements during manufacture and to reduce off-specification materials.

In addition to heretofore described embodiments with an interferometer optimizing its X,Y,Z position using a camera, other embodiments that focus the interferometer are also contemplated within the broad inventive principles hereafter disclosed. In these other embodiments, unless specified otherwise, techniques, implementations and devices used and described heretofore can be compatibly utilized hereafter.

Some embodiments of the current invention describe how one measurement system can be designed to provide both surface and center thickness measurements of a contact lens instead of two measurement systems being required to measure a contact lens surface and center thickness.

Figure 5:
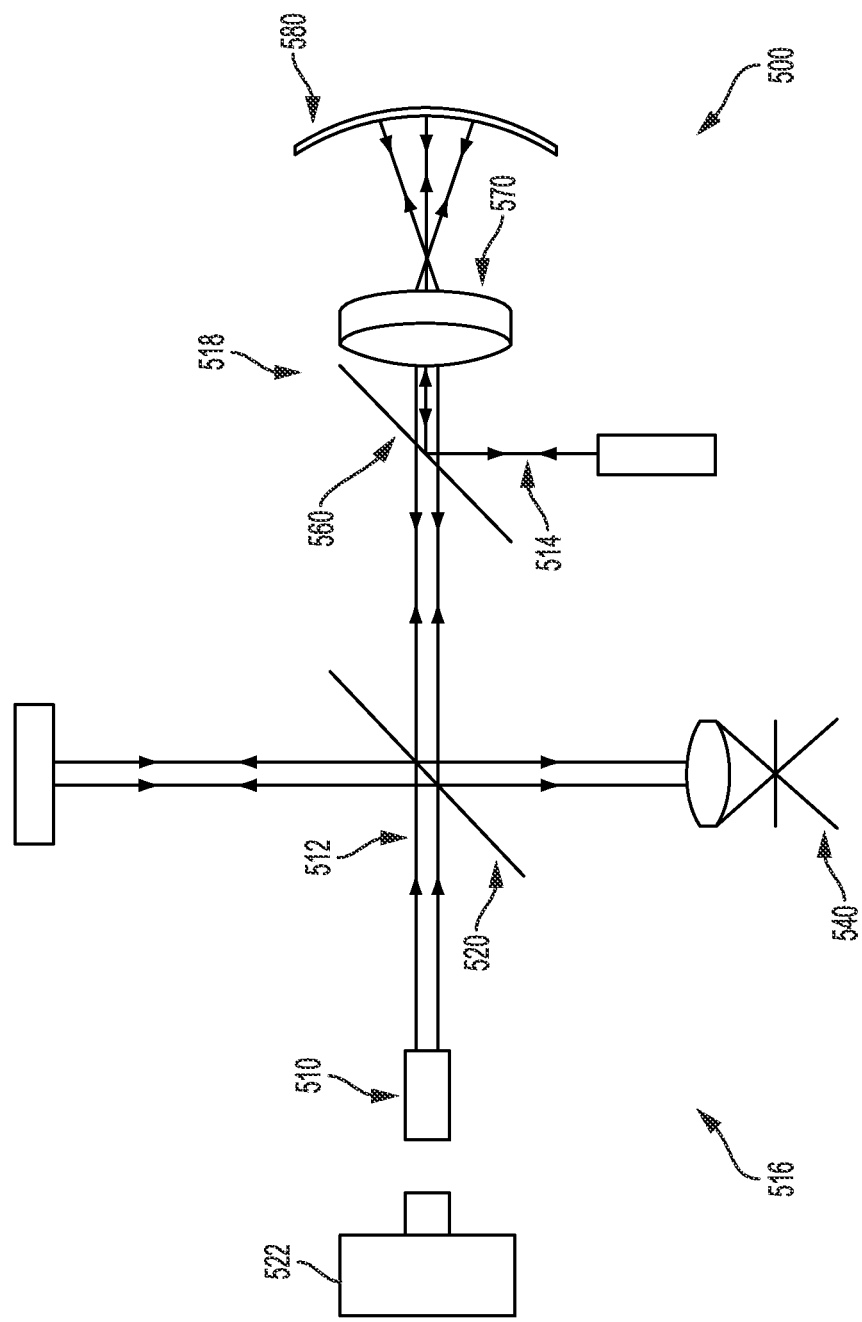
FIG. 5 shows a schematic view of an automatic alignment system, according to an embodiment of the present invention.
Figure 6:
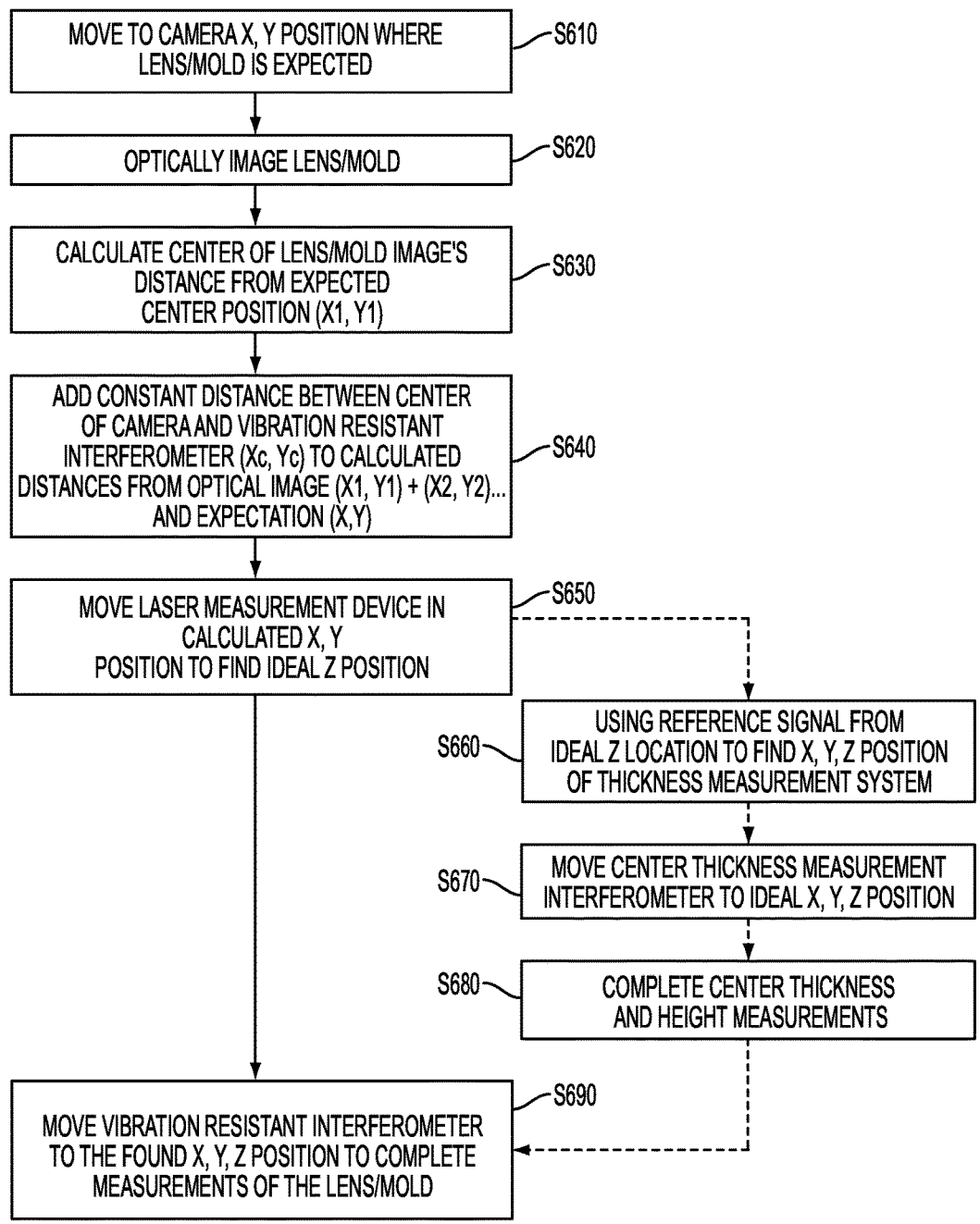
FIG. 6 provides a flow chart of iterative in-line interferometer management, according to an embodiment of the present invention.

In an embodiment, two technologies can be combined into one measurement system to measure the surface and center thickness of an ophthalmic device, e.g., a contact lens. For example, two interferometers (one used for surface and the other for center thickness) can be combined into one measurement system. The two measurement systems can be combined by inserting the beam path of the center thickness measurement system into the beam path of the surface measurement system. FIG. 5 shows the one measurement system 500 having an in-line system for measuring a physical characteristic of an ophthalmic device. The system can include a camera 522 that is configured to image an actual position of a feature of the ophthalmic device 580. The system can also include a vibration resistant interferometer 516 that is configured to project a surface measurement beam 512 having a wavelength that transmits through a beam splitter 520 onto the ophthalmic device 580. The surface measurement beam 512 can originate from a laser 510 that is small enough and that can be directed into position by initial camera measurements and processes to an ideal X/Y position. The vibration resistant interferometer 516 can be configured to send measurements to a central processing unit (CPU). The system can also include an automatic alignment system that is effective to position the vibration resistant interferometer 516 and the camera 522. The automatic alignment system can be in communication with the CPU.

The measurement system 500 can include an automatic alignment system comprising a positioner. The system can be effective to position the interferometer 516. The automatic alignment system can be in communication with the CPU.

The camera 522 can determine an optimal X, Y position of the ophthalmic device in relation to the ophthalmic device 580 by moving the camera to an expected position of the ophthalmic device and calculating an offset as a difference between the expected position and the actual position.

A laser measurement device 540 can move in a Z-direction of the surface measurement beam to focus the surface measurement beam 512 at the calculated X, Y position and determine a Z position for the feature of the ophthalmic device. The laser measurement device 540 can be a CCD type reflective laser measurement head. The measurements of the ophthalmic device can be completed by moving the vibration resistant interferometer 516 and/or ophthalmic device 580 based on the determined X, Y, Z position in relation to the ophthalmic device.

As shown in FIG. 5, the measurement system 500 can be a Twyman-Green configuration where the center thickness measurement beam 514 is inserted into the surface measurement beam 512 before the Tryman-Green diverger lens 570 using a second beam splitter 560. This embodiment can be expanded to include other types of interferometers and possibly other locations in the interferometer path. A center thickness measurement system 518 can be configured to use a reference signal to resolve a second Z position in relation to the ophthalmic device. The center thickness measurement system 518 can be configured to complete thickness and height measurements of the ophthalmic device so that the vibration resistant interferometer 516 and/or the ophthalmic device 580 is moved based upon the completed measurements.

In some embodiments, the center thickness measurement system 518 can be a center thickness measurement interferometer that transmits a center thickness beam 514 to the ophthalmic device 580 through a second beam splitter 560. The center thickness beam 514 can have a laser wavelength different from the laser wavelength of the vibration resistant interferometer 516. The center thickness beam 514 can join the surface measurement beam 514 before reaching the ophthalmic device 580. In an embodiment, the center thickness beam 514 can join the surface measurement beam before a diverger lens 570.

The laser wavelength of the surface measurement interferometer can be different enough from the center thickness interferometer for the beam splitter to be coated in such a way that it reflects the center thickness beam but transmits the surface measurement beam returning from the part-under-test. For example, in an embodiment the center thickness beam splitter or second beam splitter can reflect at a wavelength at around 1100 nm and above and can transmit at a wavelength of around 630 nm and below. The center thickness beam can thus project through a second beam splitter different from the first-mentioned beam splitter to join the surface measurement beam. Further, the wavelength of the center thickness beam can be sufficiently different from the wavelength of the surface measurement beam that the second beam splitter reflects the center thickness beam while transmitting the surface measurement beam returning from the ophthalmic device.

The center thickness interferometer 518 can measure its height above the ophthalmic device before completing the center thickness measurement and can compare the measured height to an expected value. In this regard, the center thickness measurement can be based on incorporating the measured height of the center thickness interferometer.

The ophthalmic device can be a dry contact lens and the feature that the camera images of the ophthalmic device can be a diameter of a contact lens that is measured while in a mold. The feature can be a knife edge of the front curve of the contact lens that is measured prior to dosing. The feature can be a center point of the ophthalmic device.

Online measurement systems require fast acquisition and location of measurement equipment to enable accurate measurement of ophthalmic lenses. An example is the vibration resistant interferometer system and the digital camera system where the complete position—including height above the lens—is determined through a focusing process on the digital camera. This method is functional, but there are faster ways to achieve the vertical position location using the combination of measurement devices that are used to ideally locate a final surface measuring interferometer. An objective can be to start with a rough location, then quickly dial in to a very accurate location to enable reading with the vibration resistant surface measuring interferometer.

A standard CCD type reflective laser measurement head can be used assuming the laser point is small enough, and that it can be directed into position by the initial digital camera measurements and determinations to an ideal X/Y space. By using the digital camera to find the center of the lens, for example, then moving the laser beam measurement sensor to measure distance from the laser emitter 510 to the lens surface 580, vertical height can be easily/quickly calculated within a micron—even when beginning as much as 2.5 mm out of 'ideal' position in the vertical axis. This process thus can include the optical camera determining an ideal XY position, an XYZ positioner moving the laser measurement head to focus a laser beam on the lens center point to measure an ideal Z position, then the vibration resistant interferometer moving to that precise XYZ position and completing surface and radius measurements.

In another embodiment, a thickness measurement system (one example can be an interferometer) can be moved to locate a part or ophthalmic device in Z or vertical distance. By including a reference signal from a known Z location in the measurement system 500, the location of the ophthalmic device surface can be determined. As in the above-described embodiment, the thickness measurement system can be moved using a highly accurate XYZ actuator system to the center of the lens as determined by the digital camera'sxY image and calculations. Once this interferometer beam 514 is located over the feature of the ophthalmic device, such as the center of the lens, the signal from the known reference location, combined with the signal from the lens surface, allows the determination of the distance by comparing the difference in signal location. Through such use of an interferometer to measure center thickness of the lens currently, the measurement method can be achieved by a device already in place to measure center thickness easily providing an accurate distance measurement without adding another measurement device. Thus, the use of the sequence to measure an ophthalmic device can include: 1) using a digital camera to measure XY position; 2) moving the center thickness measurement interferometer to a position correct in XY, and closely estimated by geometry into Z position, and complete both a center thickness measurement and a height measurement; and 3) using the camera's XY measurement and center thickness height measurement to drive movement of the vibration resistant surface measurement interferometer to complete the measurement of the lens (radius and surface.)

The center thickness interferometer 518 can be used to optimize its own position vertically before taking the center thickness measurement. Data indicates that being out of position in X, Y, or Z results in error in center thickness measurement. The ideal position can achieve the most accurate and repeatable result—if it is known. Therefore, after using the camera to find the ideal XY position and moving the center thickness interferometer to that position, then using the center thickness interferometer to measure its height above the lens, and a process that compares this value to its ideal value, movement of the Z actuator can be driven to the most ideal position before completing the center thickness measurement. The accuracy of the center thickness can thus be improved by several microns. Depending on the accuracy required, several microns may be very important. In some embodiments, the camera can be an optical camera.

It is understood that while the invention has been described in conjunction with the detailed description thereof, that the foregoing description is intended to illustrate and not limit the scope of the invention, which is defined by the scope of the appended claims. Other aspects, advantages, and modifications are within the scope of the claims.

What is claimed is:

1. An in-line system for measuring a physical characteristic of an ophthalmic device, the system comprising:
   a camera that is configured to image an actual position of a feature of the ophthalmic device;
   a vibration resistant interferometer that is configured to project a surface measurement beam having a wavelength that transmits through a beam splitter onto the ophthalmic device, the vibration resistant interferometer being configured to send measurements to a central processing unit (CPU);
   an automatic alignment system that is effective to position the interferometer and the camera, the automatic alignment system being in communication with the CPU,
   wherein the CPU determines an optimal X, Y position of the ophthalmic device by causing the camera to move to an expected position of the ophthalmic device and calculating an offset as a difference between the expected position and the actual position,
   wherein a sensor is configured to detect the surface measurement beam and the interferometer moves in a Z-direction to focus the surface measurement beam at the calculated X, Y position and determine a Z position for the feature of the ophthalmic device, and
   wherein the measurements of the ophthalmic device are completed by moving the vibration resistant interferometer and/or ophthalmic device based on the determined X, Y, Z position in relation to the ophthalmic device.

2. The in-line system of claim 1, further comprising:
   a center thickness measurement system that is configured to use a reference signal to resolve a second Z position in relation to the ophthalmic device,
   wherein the center thickness measurement system is configured to complete a thickness and height measurement of the ophthalmic device, wherein one of the vibration resistant interferometer or the ophthalmic device is moved based upon the completed measurements, and wherein the center thickness measurement system is a center thickness measurement interferometer that transmits a center thickness beam to the ophthalmic device through a second beam splitter, the center thickness beam having a laser wavelength different from the laser wavelength of the vibration resistant interferometer, the center thickness beam joining the surface measurement beam before reaching the ophthalmic device.

3. The in-line system of claim 2, wherein the center thickness beam joins the surface measurement beam before a diverger lens.

4. The in-line system of claim 2, wherein the center thickness interferometer measures its height above the ophthalmic device before completing the center thickness measurement and compares the measured height to an expected value, wherein the center thickness measurement is based on incorporating the measured height.

5. The in-line system of claim 2, wherein the center thickness beam projects through a second beam splitter different from the first-mentioned beam splitter to join the surface measurement beam, wherein the wavelength of the center thickness beam is sufficiently different from the wavelength of the surface measurement beam that the second beam splitter reflects the center thickness beam while transmitting the surface measurement beam returning from the ophthalmic device.

6. The in-line system of claim 1, wherein the sensor comprises a CCD.

7. The in-line system of claim 1, wherein the feature is a center point of the ophthalmic device.

8. The in-line system of claim 1, wherein the ophthalmic device is a dry contact lens and the feature is a diameter of a contact lens that is measured while in a mold.

9. The in-line system of claim 1, wherein the ophthalmic device is a dry contact lens and the feature is a knife edge of a front curve of the contact lens that is measured prior to dosing.

10. A method of measuring a physical characteristic of an ophthalmic device inline comprising:

determining an X, Y position in relation to the ophthalmic device by moving a camera to an expected position of the ophthalmic device, imaging an actual position of the ophthalmic device, calculating an offset as a difference between the expected position and the actual position, and applying the offset to the expected position;

positioning a vibration insensitive interferometer to the X, Y position in relation to the ophthalmic device using an automatic alignment system, the automatic alignment system comprising a positioner;

projecting a surface measurement beam onto the ophthalmic device, the surface measurement beam having a wavelength that transmits through a beam splitter;

determining a Z position in relation to the ophthalmic device by moving a sensor at the calculated X, Y position in a direction of the surface measurement beam and focusing the surface measurement beam on the determined X, Y position of the ophthalmic device; and completing the measurements of the ophthalmic device by moving the vibration resistant interferometer and/or ophthalmic device based on the determined X, Y, Z position.

11. The method of claim 10, further comprising:

completing thickness and height measurements of the ophthalmic device using a center thickness measurement system;

resolving a second Z position in relation to the ophthalmic device using a reference signal having a known Z position; and moving one of the vibration resistant interferometer or the ophthalmic device based upon the completed measurements.

12. The method of claim 11, wherein the center thickness measurement system is a center thickness measurement interferometer that is configured to project a center thickness beam at the ophthalmic device, the center thickness beam having a wavelength different from the surface measurement beam.

13. The method of claim 12, wherein the center thickness beam projects through a second beam splitter different from the first-mentioned beam splitter to join the surface measurement beam, wherein the wavelength of the center thickness beam is sufficiently different from the wavelength of the surface measurement beam that the second beam splitter reflects the center thickness beam while transmitting the surface measurement beam returning from the ophthalmic device.

* * * * *